US008452980B1

(12) United States Patent
Black et al.

(10) Patent No.: US 8,452,980 B1
(45) Date of Patent: May 28, 2013

(54) DEFEATING REAL-TIME TROJAN LOGIN ATTACK WITH DELAYED INTERACTION WITH FRAUDSTER

(75) Inventors: Robert Seth Black, Brookline, MA (US); Karl Ackerman, Topsfield, MA (US)

(73) Assignee: EMC Corporation, Hopkinton, MA (US)

( * ) Notice: Subject to any disclaimer, the term of this patent is extended or adjusted under 35 U.S.C. 154(b) by 553 days.

(21) Appl. No.: 12/748,619

(22) Filed: Mar. 29, 2010

(51) Int. Cl.
*G06F 21/00* (2006.01)
(52) U.S. Cl.
USPC .......................................................... 713/185
(58) Field of Classification Search
USPC .............. 713/168, 172, 185, 182, 183; 726/4, 726/9
See application file for complete search history.

(56) References Cited

U.S. PATENT DOCUMENTS

| 2002/0095570 | A1* | 7/2002 | Eldridge et al. | 713/155 |
|---|---|---|---|---|
| 2005/0166263 | A1 | 7/2005 | Nanopoulos et al. | |
| 2005/0283444 | A1* | 12/2005 | Ekberg | 705/67 |
| 2007/0133591 | A1* | 6/2007 | Shatford | 370/457 |
| 2007/0250923 | A1* | 10/2007 | M'Raihi | 726/18 |
| 2007/0256123 | A1* | 11/2007 | Duane et al. | 726/6 |
| 2008/0086771 | A1* | 4/2008 | Li et al. | 726/20 |
| 2008/0168543 | A1* | 7/2008 | von Krogh | 726/6 |

* cited by examiner

*Primary Examiner* — Samson Lemma
(74) *Attorney, Agent, or Firm* — BainwoodHuang

(57) ABSTRACT

A method of detecting a fraudulent login attempt across a network is provided. The method includes (a) receiving, at some time, a login request from a client, the login request including (1) a username associated with a user account, (2) a static password associated with the user account, and (3) a one-time password provided by a token, (b) calculating whether the time is more than a predetermined amount of time after a most-recent login to the account, (c) when the time is more than the predetermined time since the most-recent login, accepting the login request according to a first mode, and (d) when the first time is not more than the predetermined time since the most-recent login, accepting the login request according to a second mode, the second mode rejecting a greater proportion of login attempts than the first mode rejects. An apparatus and computer program product are also provided.

23 Claims, 4 Drawing Sheets

Fig. 4   300

| 302 Conditions | 304 First Mode | 306 Second Mode |
|---|---|---|
| When mode applies? | Login-LastLogin > PAT | Login-LastLogin <= PAT |
| If Login within small window | ALLOW | ALLOW |
| If Login outside small window, but inside large window | Prompt for next tokencode<br>Correct: ALLOW<br>Incorrect: DENY | DENY |
| If Login outside large window | DENY | DENY |

Fig. 5   310

| 312 Conditions | 314 First Mode | 316 Second Mode |
|---|---|---|
| When mode applies? | Login-LastLogin > PAT | Login-LastLogin <= PAT |
| If Login within small window | R1 | R3 |
| If Login outside small window, but inside large window | Prompt for next tokencode<br>Correct: R2<br>Incorrect: DENY | DENY |
| If Login outside large window | DENY | DENY |

DEFEATING REAL-TIME TROJAN LOGIN ATTACK WITH DELAYED INTERACTION WITH FRAUDSTER

BACKGROUND

In some conventional systems, users are provided with hardware or software tokens to increase security in authentication when logging in to an account across a network. These tokens typically display a code that varies with time, based on an internal clock that synchronizes with a server clock. The user must enter in the code in the login process, which the server can verify as being the correct code based on the time. In many systems, the code on the token varies at 1-minute intervals. In order to account for delay in entering the code and slight de-synchronization between the clocks on the token and the server, the servers in these systems typically accept the previous and the subsequent code in the sequence, in addition to the current code. These three codes are sometimes referred to as the "small window."

Because some tokens have clocks subject to significant drift problems, the token can become significantly out of synchronization with the server after several months. Therefore, if the code entered by the user is not within the small window, but is within a surrounding large window (conventionally defined as the codes for the current time+/−10 minutes), then the user may be conditionally authenticated if the user is able to enter a subsequent valid code. This ensures that the user has not snooped a valid code from another valid user in order to gain unauthorized access.

SUMMARY

Unfortunately, if a Trojan horse (Trojan for short) has infected a user's computer, the Trojan can steal the user's login information and pass it on to a remote fraudster via a network. The fraudster may then attempt to log in to the user's account on the server. If sufficient time has passed since the user initially logged in with the token (e.g., 1.5 minutes), the token code may no longer be within the small window. However, if the fraudster is prompted by the server for a subsequent code, the Trojan may be configured to pose as the application and prompt the user for additional token codes that the Trojan can immediately send to the fraudster in order for the fraudster to be able to reply to the server with the next token code.

Embodiments of the present invention avoid this deficiency by selectively disabling the availability of the large window for a period after a successful authentication is performed. If the user has not logged in recently, it can be assumed that the login attempt is coming from the valid user, and a normal authentication procedure is performed. But, if the user has logged in recently (e.g., within the last 10 minutes), there is a risk that the login attempt may be coming from a fraudster, having stolen the user's login data, so a stricter, more demanding authentication procedure is required to ascertain whether the login attempt is valid. In several embodiments, this stricter procedure includes rejecting the login attempt if the initial token code is not within the small window, without regard for a subsequently-entered next token code.

In one embodiment, a method of detecting a fraudulent login attempt across a network is provided. The method includes (a) receiving, at a first time, by a server device via a network connection, a login request from a client device, the login request including (1) a username associated with a user account, (2) a static password associated with the user account, and (3) a one-time password (OTP) provided by a token device, (b) calculating, by the server device, whether the first time is more than a predetermined amount of time after a most-recent login to the user account, (c) when the first time is more than the predetermined time since the most-recent login to the user account, accepting, by the server device, the login request according to a first mode of operation, and (d) when the first time is not more than the predetermined time since the most-recent login to the user account, accepting, by the server device, the login request according to a second mode of operation, the second mode rejecting a greater proportion of login attempts than the first mode rejects. In some embodiments, the modes of operation follow strict rules. In other embodiments, the modes of operation assign various levels of risk and operate according to risk-based algorithms.

An apparatus and computer program product for performing the various methods are also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 4 illustrates details of two modes of operation used in several embodiments.

FIG. 5 illustrates details of two modes of operation used in several other embodiments.

DETAILED DESCRIPTION

Various embodiments of the present invention reduce the chance that a fraudster can successfully impersonate a user with login data collected via a Trojan by selectively disabling the availability of the large window for a period after a successful authentication is performed. If the user has not logged in recently, it can be assumed that the login attempt is coming from the valid user, and a normal authentication procedure is performed. But, if the user has logged in recently (e.g., within the last 10 minutes), there is a risk that the login attempt may be coming from a fraudster, having stolen the user's login data, so a stricter, more demanding authentication procedure is required to ascertain whether the login attempt is valid. In several embodiments, this stricter procedure includes rejecting the login attempt if the initial token code is not within the small window, without regard for a subsequently-entered next token code.

Figure 1:
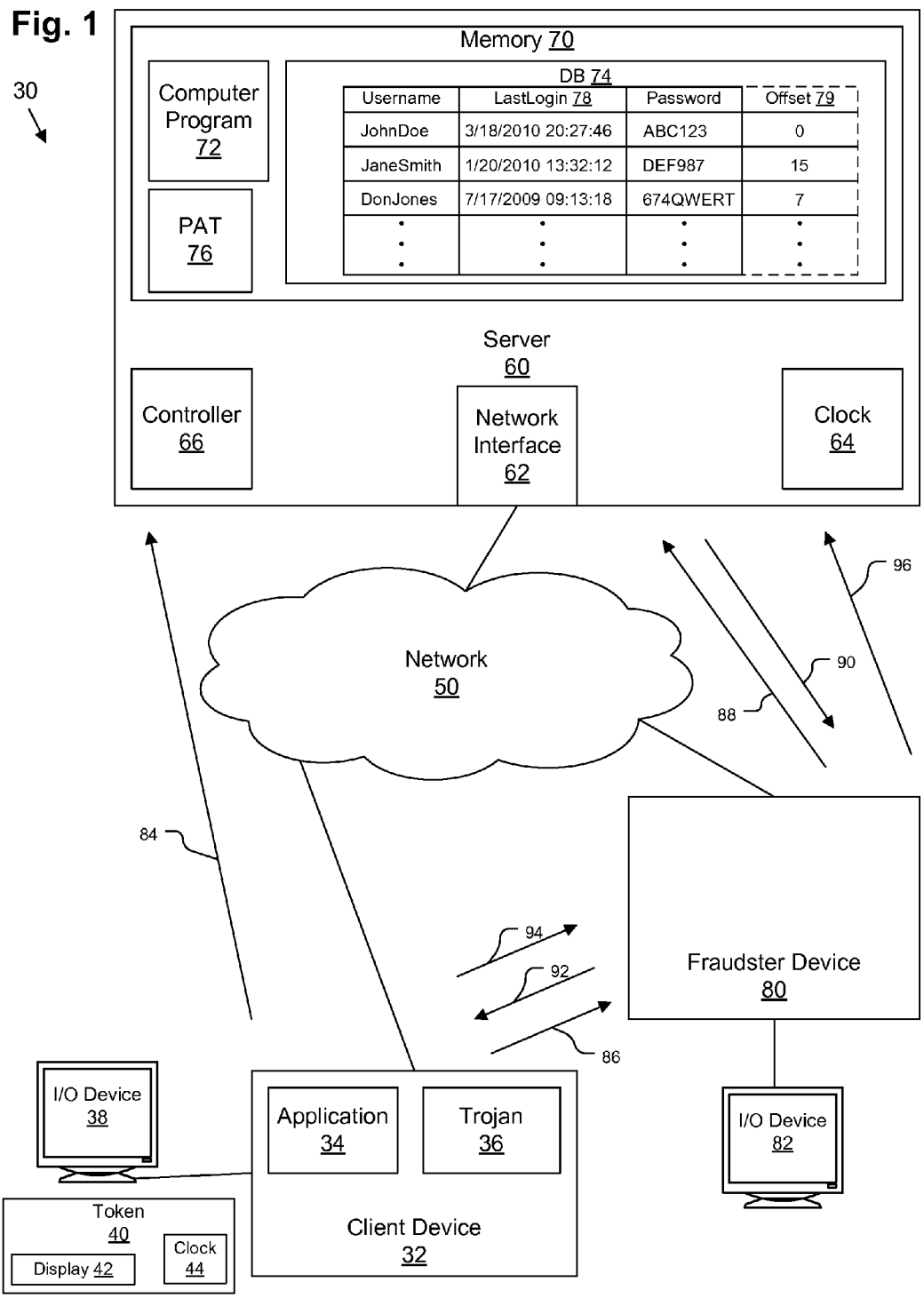
FIG. 1 illustrates a system for use in various embodiments.

FIG. 1 illustrates a system 30 for use in practicing various embodiments. System 30 includes a client device 32. Client device 32 can be a personal computer or it may be any other type of computing device capable of logging into a remote service requiring authentication. Client device 32 also includes a local application 34 configured to attempt to log in to a remote service across network 50. Local application 34 can be, for example, a web browser displaying a web site that requires remote authentication. Local application 34 can also be a standalone application dedicated to communicating with a remote service. Client device 32 can also, in some cases, include a Trojan horse application 36 (hereinafter Trojan), which is a malicious computer program that infects client device 32 and commandeers performance of the computer, potentially without a user's knowledge. In particular, Trojan 36 can be, as one example, the ZEUS Trojan. Client device connects to one or more input/output (I/O) devices 38. In one embodiment, I/O devices 38 include a display screen, a keyboard, and a mouse. In other embodiments, various input and output features may be combined within a single device, such as a touch-sensitive screen.

A user of the client device also has access to a token 40. Token 40 contains a display screen 42, such as, for example, an 8-digit liquid crystal display (LCD) screen, as well as an internal clock 44. In some embodiments, token 40 is a software construct operating on client device 32 or on another user device (such as, for example, a smartphone) with access to the display and internal clock of that device or a device that can receive a message generated on the server 60 or other OTP generation point (such as, for example, an SMS message sent to a users phone).

Client device 32 connects to network 50 in a conventional manner. Network 50 can be any type of network in existence (whether in the past, present, or future), such as, for example, the Internet, the Internet II, a local area network (LAN), a wide area network, etc. Client device 32 connects, through the network 50 to a server 60 running a remote service that the user desires to login to.

Server 60 includes a network interface 62 for connecting to network 50, a clock 64, a controller 66 (which may be, for example, a central processing unit (CPU)), and memory 70. Memory 70 can be any tangible computer-readable medium (such as, for example, a hard disk, a floppy disk, an optical disk, computer memory, flash memory, etc.). Memory can be any combination of volatile and non-volatile storage; memory 70 can include both the random access memory (RAM) used in the normal operation of a computer as well as one or more storage devices (such as, for example, a hard disk, a floppy disk, an optical disk, flash memory, etc.) which store applications and application data. Memory 70 stores a computer program 72, whose operation will be discussed in further detail below. Memory 70 also stores a user database (DB) 74 which stores a set of associations between usernames, passwords, and the last time an account associated with each username was last successfully logged into (LastLogin 78).

System 30 can also, in some cases, include a fraudster device 80, which can be any kind of computing device, such as, for example, a personal computer. Fraudster device 80 can connect to one or more input/output (I/O) devices 82. The fraudster device 80 can be physically located in any location around the world capable of connecting to the network 50, and indeed, fraudster device 80 is often advantageously located in Eastern Europe, making it difficult for authorities to identify and seize the fraudster device 80. Fraudster device 80 communicates with Trojan 36 across an instant message chat connection or across any other mode of real-time or near-real-time communication, typically across network 50.

In conventional operation, a user uses application 34 to attempt to log in to a remote service on server 60. In order to do so, the user enters, via I/O device 82, (a) his username (e.g., JohnDoe), (b) his password (e.g., ABC123), and (c) a tokencode currently displayed on display screen 42 of user's token 40. The token 40 calculates the tokencode by applying a shared secret algorithm to the current time as indicated by clock 44. The data entered by the user (a-c) is received by local application 34, running on client device 32. Client device 32, under direction of local application 34, transmits 84 this information across network 50 to server 60, where controller 66 (running, in some embodiments, computer program 72) compares the submitted data to data stored in user DB 74 and to a tokencode or a set of tokencodes generated by controller 66 based on the current time as indicated by the clock 64 using the same shared secret algorithm used by token 40. If the controller 66 determines that the username and password correspond to a known user account and that the received tokencode corresponds to the current time (or to a time sufficiently close to the current time), then controller 66, in a conventional system would successfully authenticate the user of the client device 32 and allow access to the remote application.

However, in the case where the client device 32 is infected with Trojan 36, Trojan 36 secretly sends 86 the data (a-c) entered by the user to the fraudster device 80, such as through a chat window of an instant messaging service. However, since there is usually some delay in sending the data to the fraudster device 80, and since an operator of the fraudster device 80 may require some time to interpret the data as an authentication attempt into a particular server 60, it will typically take several minutes for the operator of the fraudster device 80 to be able to attempt to log in 88 to the same server 60 using the captured login information. Thus, it is likely that by the time the operator attempts to log in 88 to the server 60, the current tokencode will no longer be current. In a conventional system, at this point, the server 60 responds back to the fraudster device 80 with a request 90 for a next subsequent tokencode. At this point, fraudster device 80 sends a request 92 to Trojan 36 on client device 32, asking for the requested next subsequent tokencode. Trojan 36 then hijacks the client device 32, such as by mimicking the appearance of application 34, and requests that the user enter the current tokencode then displayed on the token 40, so that the new tokencode can be sent 94 back to the fraudster device 80. Upon receiving the tokencode, the operator of fraudster device 80 can respond back 96 to the server 60 with the next tokencode and successfully authenticate fraudulently. In some cases, the Trojan 36 may request one or more subsequent tokencodes from the user at the initial login time (with a delay as the user must wait for the token to update), thereby eliminating the need for back and forth communications 92, 94.

Figure 2:
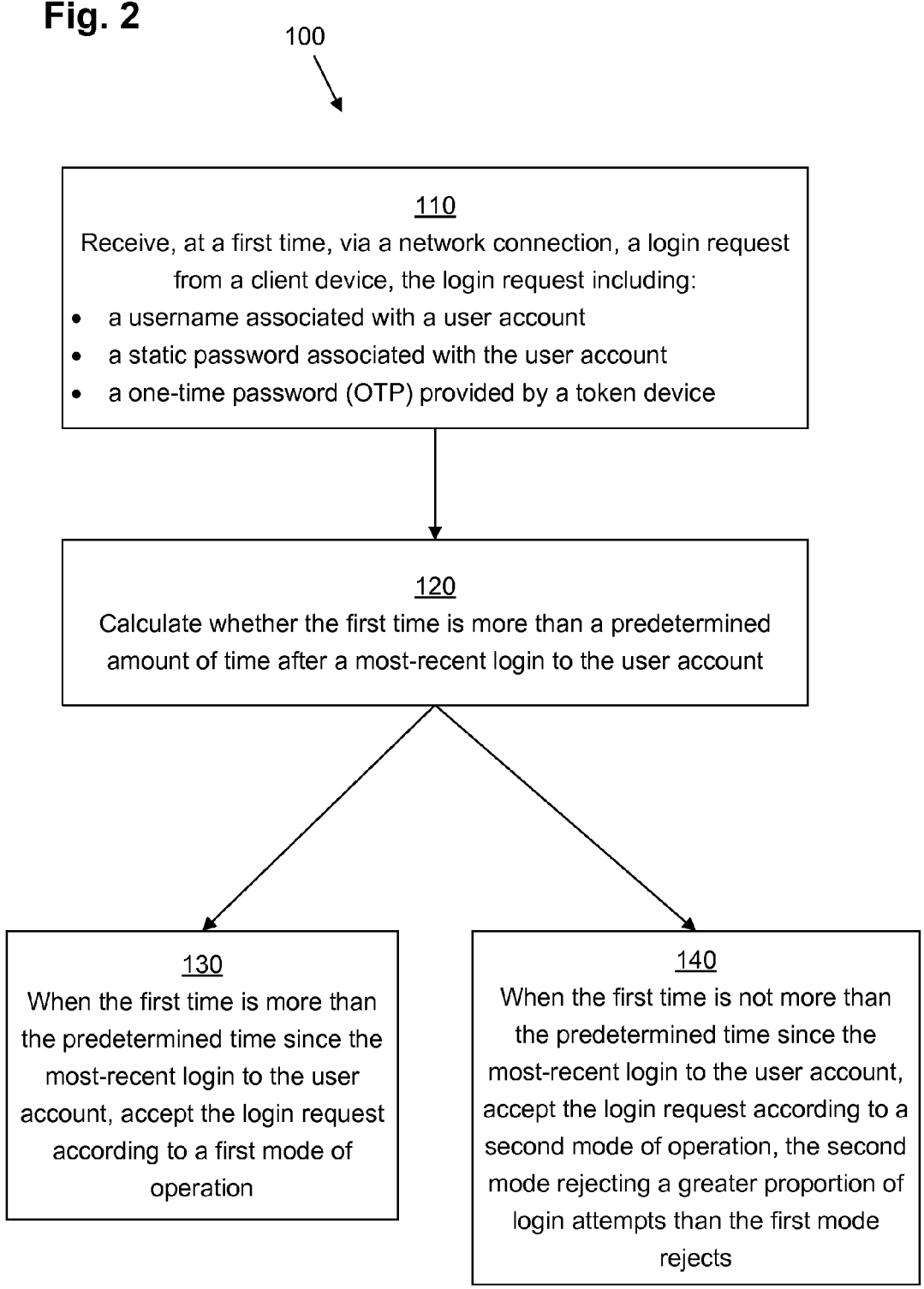
FIG. 2 illustrates a method of one embodiment.

However, in one embodiment of the invention, method 100 as depicted in FIG. 2, is used to prevent the unauthorized access. In step 110, controller 66, at a current login time, receives a login request 84 from the client device 32 (or possibly a login request 88 from fraudster device 80). This login request 84, 88 typically includes (a) a username, (b) a password, and (c) a one-time password, which is a time-based password generated in real-time by a token 40 using a shared secret algorithm operating on the current time.

In step 120, controller 66 calculates how long it has been since the account currently being accessed was last successfully accessed. This is done with reference to LastLogin time 78 (which represents the last time the account was successfully accessed) stored in user DB 74 and to the current login time (using a simple subtraction operation). The controller 66 then compares this time to a predetermined amount of time (PAT) 76 which is also stored in memory 70. This PAT 76 may be any configurable value, although, in one embodiment, it will typically range from 10 to 100 minutes (although in another embodiment, it will typically range from 1 hour to 1 year). If the calculated time since the last successful login is more than the PAT 76, then controller 66 determines whether to allow access according to a first mode of operation. If the calculated time since the last successful login is less than the PAT 76, then controller 66 determines whether to allow access according to a second, stricter, mode of operation. If the calculated time is exactly equal to the PAT 76, then in one embodiment, the first mode is chosen, while in another embodiment, the second mode is chosen (but method 100 depicts the second mode being chosen in this case). The first and second modes of operation will be described in further detail below in connection with FIGS. 4 and 5. Thus, if the user has not logged in recently, a normal authentication procedure is performed, but, if the user has logged in recently (e.g., within the last 10 minutes), there is a risk that the login attempt 84, 88 may be coming from a fraudster device 80, having stolen the user's login data, so a stricter, more demanding authentication procedure is required to ascertain whether the login attempt is a valid 84 or fraudulent 88 one.

In order to understand the detailed operation of the first and second modes of operation, additional information about tokencodes and windows must first be understood. This information is now presented in connection with FIG. 3.

Figure 3:
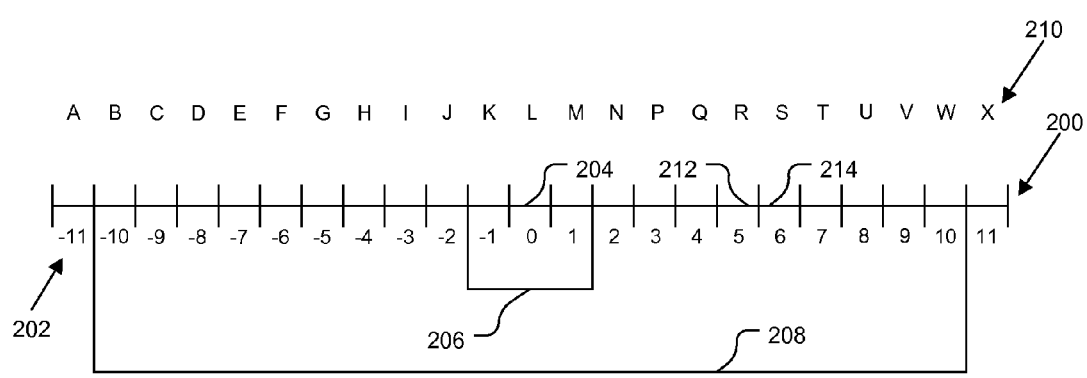
FIG. 3 illustrates a timeline and associated features associated with several embodiments.

FIG. 3 depicts a timeline 200 associated with various tokencode windows. On timeline 200, various minutes 202 (ranging from −11 to 11) are marked below the line. The $0^{th}$ minute 204 represents the current minute. Thus, for example, if the current time is 9:25:15 pm on Mar. 18, 2010, then the current minute 204 is 21:25 on Mar. 18, 2010, and it will remain the current minute 204 until 9:26:00 pm on the same date. Various tokencodes (represented by the letters A-N and P-X—note that the letter 'O' is omitted to avoid confusion with the number zero) are also depicted in FIG. 3, marked above the line. Each tokencode 210 corresponds to a particular minute 202 on the timeline. Thus, the tokencode 210 associated with the current minute 204 is tokencode L. Each tokencode 210 is actually a multi-digit number, generated by a shared secret algorithm (e.g., a cryptographic algorithm) operating on the associated minute 202. Thus, in one embodiment, each tokencode is an 8-digit number. So, for example, L may be 12345678, while M may be 93754628, and K may be 92645249.

First (small) window 206 includes minutes −1, 0, and 1. Thus, referring back to the example, at time 9:25:15 pm on Mar. 18, 2010, first window 206 is associated with tokencodes K, L, and M. Thus, although a user attempting to log in to server 60 at that time would be expected to enter tokencode L (12345678), if the user instead entered 92645249 (represented by K, as could happen if the user typed in the tokencode at 9:24:50 and then waited 25 seconds to submit the login request, or if the clock 44 on user's token 40 were 30 seconds slow) or 93754628 (represented by M, as could happen if the clock 44 on user's token 40 were 50 seconds fast), the user would still be within the first window, and authentication would proceed normally.

Second (large) window 208 includes minutes −10 through 10 (although this is by way of example only—second window 208 can have any predetermined, administrator-configurable, size, typically extending from a minute with a number ranging from −72 to −5 until a minute with a number ranging from 5 to 72). In some embodiments, the size of second window 208 can vary from one login request to another. For example, the size of second window 208 can be increased when the last time the account was successfully accessed was very recent, while the size of second window 208 can be decreased when the last time the account was successfully accessed was not very recent (e.g., second window 208 may be +/−5 minutes when the last login was within the last 5 minutes, but second window 208 may be +/−72 minutes when the last login was a year ago, varying smoothly for values in between 5 minutes and 1 year). Thus, tokencodes A and X are not associated with the second window 208, but tokencodes B-N and P-W are associated with the second window 208.

Referring back to FIG. 2, recall that two modes of operation are used depending on the outcome of step 120. Details of various embodiments of these two modes will now be presented, below, with reference to the first and second windows described in connection with FIG. 3. Two embodiments are discussed. The first embodiment of the two modes is described in connection with FIG. 4. The second embodiment of the two modes is described in connection with FIG. 5.

Referring now to FIG. 4, in the first embodiment, table 300 shows the operation of the first mode 304 following from step 130 and the second mode 306 following from step 140. Column 302 lists the possible conditions that are described by modes 304, 306. As discussed above with respect to steps 130 and 140, and as shown in table 300, first mode 304 applies when the current login time minus the LastLogin time 78 stored in user DB 74 for the account being accessed is greater than or equal to PAT 76, and second mode 306 applies when the current login time minus the LastLogin time 78 stored in user DB 74 for the account being accessed is less than PAT 76.

In first mode 304, if the current login time is within the first window 206, then the login request is accepted (assuming that the username and password have already been verified as correctly matching).

If the current login time is outside the first window 206 but within the second window 208, then controller 66 prompts (by signaling local application 34 running on client device 32) the user to enter the next tokencode 210 in the sequence. If the very next tokencode 210 is correctly entered, then the login request is accepted (assuming that the username and password have already been verified as correctly matching). But, if the very next tokencode 210 is not correctly entered, then the login request is rejected. In some embodiments, if the next tokencode is successfully entered, then not only is authentication allowed, but computer program 72 also stores an offset 79 in user DB 74 of memory 70 associated with that account. The value stored as the offset 79 is the number of minutes difference between the minute number of the initially entered tokencode and the current minute 204. This offset 79 may be used in all subsequent operations associated with that account so that all future login times are corrected to the value expected to be used by the clock 44 on the token 40 rather than the clock 64 of the server 60.

If the current login time is outside even the second window 208, then the login request is rejected.

In second mode 306, if the current login time is within the first window 206, then the login request is accepted (assuming that the username and password have already been verified as correctly matching). This operation is the same as in first mode 304.

If the current login time is outside the first window 206 but within the second window 208, then controller 66 automatically rejects (or denies) the login request. Controller does not prompt the user for the next tokencode 210 at all. This operation differs from the operation of first mode 304.

If the current login time is outside even the second window 208, then the login request is rejected as in the first mode 304.

Thus, if at 9:25:15 pm on Mar. 18, 2010, user enters username "JohnDoe," password "ABC123" (see FIG. 1) and tokencode "12345678" (which may be represented as L), then the login request is accepted because under either the first mode 304 or the second mode, the login is within the first window 206. Similarly, if the user entered tokencodes K or M at that time, the login is also within the first window 206 and should be accepted.

However, if at 9:25:15 pm on Mar. 18, 2010, user enters username "JohnDoe," password "ABC123" (see FIG. 1) and tokencode R (associated with $5^{th}$ minute 212), then the result will depend on which mode 304, 306 is used. If PAT 76 has a value of 100 minutes, then since the user's last successful login was 57:29 minutes prior to the current time (having last logged in at 8:27:46 pm on Mar. 18, 2010 according to DB 74 as depicted in FIG. 1) and 57:29<100:00, first mode 304 will be entered, and since the tokencode R is associated with a time outside the first window 206, controller 66 will send a message to the user (either at client device 32 or fraudster device 80), requesting the next tokencode. If the user enters tokencode S (associated with $6^{th}$ minute 214), then the login request is accepted (and in embodiments with offsets, the value 5 is stored as the offset 79 for the user with username "JohnDoe" to indicate that that user's token 40 has a clock 44 that is about 5 minutes fast, so all future times associated with events for that account, as measured by server clock 64, should be corrected by adding 5 minutes). If, however, the user enters any value other than tokencode S, then the login request is rejected.

If, on the other hand PAT 76 has a value of 10 minutes, then since the user's last successful login was 57:29 minutes prior to the current time (having last logged in at 8:27:46 pm on Mar. 18, 2010 according to DB 74 as depicted in FIG. 1) and 57:29>10:00, second mode 306 will be entered, and since the tokencode is associated with a time outside the first window 206, controller 66 rejects the login request.

A second embodiment is now described with reference to FIG. 5. In FIG. 5, table 310 shows the operation of the first mode 314 following from step 130 and the second mode 316 following from step 140. Column 312 lists the possible conditions that are described by modes 314, 316. As discussed above with respect to steps 130 and 140, and as shown in table 310, first mode 314 applies when the current login time minus the LastLogin time 78 stored in user DB 74 for the account being accessed is greater than or equal to PAT 76, and second mode 316 applies when the current login time minus the LastLogin time 78 stored in user DB 74 for the account being accessed is less than PAT 76.

Table 310 further indicates that in first mode 314, if the current login time is within the first window 206, then controller 66 stores a risk value of R1 as an OTP risk factor of the login request.

If the current login time is outside the first window 206 but within the second window 208, then controller 66 prompts (by signaling local application 34 running on client device 32) the user to enter the next tokencode 210 in the sequence. If the very next tokencode 210 is correctly entered, then controller 66 stores a risk value of R2 as the OTP risk factor of the login request. R2 is greater than R1. But, if the very next tokencode 210 is not correctly entered, then the login request is rejected outright (although in one embodiment, a very high risk R4 may instead be entered, if the newly-entered tokencode is associated with a nearby minute). In some embodiments, in first mode 314, if the next tokencode is successfully entered, then not only is risk R2 assigned, but controller 66 also stores an offset 79 in user DB 74 of memory 70 associated with that account. The value stored as the offset 79 is the number of minutes difference between the minute number of the initially entered tokencode and the current minute 204. This offset 79 may be used in all subsequent operations associated with that account so that all future login times are corrected to the value expected to be used by the clock 44 on the token 40 rather than the clock 64 of the server 60.

If the current login time is outside even the second window 208, then the login request is rejected.

In second mode 316, if the current login time is within the first window 206, then controller 66 stores a risk value of R3 as the OTP risk factor of the login request. R3 is greater than R1, indicating that even though the current login time is within the first window 206, the mere fact that second mode 316 has been entered (which means that the user has logged in quite recently, which is somewhat suspicious), the situation is at least somewhat riskier than had the first mode 314 been entered. It is not necessary to strictly define R3 as greater than or less than R2 because the relative risk of these situations is implementation-specific (although, presumably, in most cases R2>R3). This operation differs from the operation of first mode 314.

If the current login time is outside the first window 206 but within the second window 208, then controller 66 automatically rejects (or denies) the login request. Controller does not prompt the user for the next tokencode 210 at all. This operation differs from the operation of first mode 314.

If the current login time is outside even the second window 208, then the login request is rejected as in the first mode 314.

In the second embodiment, once an OTP risk factor has been assigned, both modes 314, 316 proceed to calculate a combined risk score for the login attempt. This is done by mathematically combining the stored OTP risk factor with other risk factors that are also be calculated by controller 66. These other risk factors may include (but are not limited to): (a) the geographic location from which the user is attempting to log in as best ascertained by looking at the IP addresses of intermediate hops between the client device 32 or fraudster device 80 and the server 60 (e.g., if a user is logging in from Eastern Europe, there is a higher risk that he is a fraudster), (b) whether or not the account has previously been tagged as having been fraudulently accessed, (c) with what likelihood the user has determined his account is likely to be targeted for attack (e.g., a high-ranking government official may be more likely to be targeted than a typical user), (d) how long the user took to enter his authentication data, etc. Once the combined risk score has been calculated, if the combined risk score exceeds a threshold value, controller 66 denies the login request. Otherwise it is accepted (assuming that the username and password have already been verified as correctly matching).

In another embodiment, before the combined risk score is calculated, the OTP risk factor is augmented. This may be done by increasing the OTP risk factor by a value which is inversely proportional (or by some other inverse relationship) to the time since the last login (Login—LastLogin). In another embodiments, this step is only performed in the second mode 316, but it is omitted in first mode 314.

In another embodiment, the OTP risk score is directly compared to the threshold value without combining with any other risk factors.

Thus, various methods, apparatuses, and computer program products embodying techniques for defeating real-time Trojan attacks with delayed interaction with the user have been presented.

While various embodiments of the invention have been particularly shown and described, it will be understood by those skilled in the art that various changes in form and details may be made therein without departing from the spirit and scope of the invention as defined by the appended claims.

For example, although method 100 has been described as being performed by controller 66 (running computer program 72), it should be understood that this is by way of example only. In some embodiments, method 100 may be performed by server 60 directly through specialized hardware circuits without any need for software.

It should also be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

We claim:

1. A method of detecting a fraudulent login attempt across a network, the method comprising:
  receiving, at a first time, by a server device via a network connection, a login request from a client device, the login request including:
    a username associated with a user account; and
    a one-time password (OTP) provided by a token device;
  calculating, by the server device, whether the first time is more than a predetermined amount of time after a most-recent login to the user account;
  when the first time is more than the predetermined time since the most-recent login to the user account, accepting, by the server device, the login request according to a first mode of operation; and
  when the first time is not more than the predetermined time since the most-recent login to the user account, accepting, by the server device, the login request according to a second mode of operation;
  wherein:
    the first mode of operation includes:
      accepting, by the server device, the login request, if the OTP is associated with a time within a first time window;
      if the OTP is associated with a time which is outside the first time window but is within a second time window, the second time window being larger than the first time window, then:
        prompting, by the server device, the individual to enter a new OTP; and
        accepting, by the server device, the login request if the new OTP is associated with a time immediately following the first time; and
      otherwise, rejecting, by the server device, the login request; and the second mode of operation includes:
      accepting, by the server device, the login request, if the OTP is associated with a time within the first time window; and
      otherwise, rejecting, by the server device, the login request.

2. A method as in claim 1 wherein the first mode of operation further includes, if the OTP is associated with the time which is outside the first time window but is within the second time window, then recording, by the server device, a time offset to indicate a known time difference between a token clock and a server clock, the time offset being used by the server device to generate corrected times.

3. A method as in claim 2 wherein:
  the first time window is a range of time including about one minute before and one minute after a current minute according to the server clock, corrected by the recorded time offset if a time offset has been recorded; and
  the second time window is a range of time ranging from 5 to 72 minutes before the corrected current minute, until 5 to 72 minutes after the corrected current minute.

4. A method as in claim 3 wherein the predetermined time is between about 10 minutes and 100 minutes.

5. A method as in claim 1 wherein receiving the login request from the client device includes receiving, within the login request, a static password associated with the user account, the static password being distinct from the OTP.

6. A method of detecting a fraudulent login attempt across a network, the method comprising:
  receiving, at a first time, by a server device via a network connection, a login request from a client device, the login request including:
    a username associated with a user account; and
    a one-time password (OTP) provided by a token device;
  calculating, by the server device, whether the first time is more than a predetermined amount of time after a most-recent login to the user account;
  when the first time is more than the predetermined time since the most-recent login to the user account, accepting, by the server device, the login request according to a first mode of operation; and
  when the first time is not more than the predetermined time since the most-recent login to the user account, accepting, by the server device, the login request according to a second mode of operation;
  wherein:
    the first mode of operation includes:
      assigning, by the server device, a first risk value as an OTP risk factor of the login request, if the OTP is associated with a time within a first time window;
      if the OTP is associated with a time which is outside the first time window but is within a second time window, the second time window being larger than the first time window, then:
        prompting, by the server device, the individual to enter a new OTP; and
        assigning, by the server device, a second risk value as the OTP risk factor of the login request if the new OTP is associated with a time immediately following the first time, the second risk value being greater than the first risk value; and
      otherwise, rejecting, by the server device, the login request;
    the second mode of operation includes:
      assigning, by the server device, a third risk value as the OTP risk factor of the login request, if the OTP is associated with a time within a first time window, the third risk value being greater than the first risk value; and
      otherwise, rejecting, by the server device, the login request; and
    the method further includes allowing, by the server device, the login request based on a risk score calculated by combining the assigned OTP risk factor of the login request with one or more additional risk factors of the login request.

7. A method as in claim 6 wherein the one or more additional risk factors includes a risk factor associated with the location of the client device.

8. A method as in claim 6 wherein the second mode of operation further includes increasing the OTP risk factor by a value inversely proportional to the time difference between the most-recent login to the user account and the first time.

9. A method as in claim 6 wherein the first mode of operation further includes, if the OTP is associated with the time which is outside the first time window but is within the second time window, then recording, by the server device, a time offset to indicate a known time difference between a token clock and a server clock, the time offset being used by the server device to generate corrected times.

10. A method as in claim 9 wherein:
the first time window is a range of time including about one minute before and one minute after a current minute according to the server clock, corrected by the recorded time offset if a time offset has been recorded; and
the second time window is a range of time ranging from 5 to 72 minutes before the corrected current minute, until 5 to 72 minutes after the corrected current minute.

11. A method as in claim 10 wherein the predetermined time is between about 1 hour and 1 year.

12. A method as in claim 6 wherein receiving the login request from the client device includes receiving, within the login request, a static password associated with the user account, the static password being distinct from the OTP.

13. A computer program product comprising a non-transitory computer-readable medium, the computer-readable medium storing instructions, which, when performed by a computerized device, to cause the computerized device to:
receive, at a first time, via a network connection, a login request from a client device, the login request including:
a username associated with a user account; and
a one-time password (OTP) provided by a token device;
calculate whether the first time is more than a predetermined amount of time after a most-recent login to the user account;
when the first time is more than the predetermined time since the most-recent login to the user account, accept the login request according to a first mode of operation; and
when the first time is not more than the predetermined time since the most-recent login to the user account, accept the login request according to a second mode of operation;
wherein:
the first mode of operation includes:
accepting the login request, if the OTP is associated with a time within a first time window;
if the OTP is associated with a time which is outside the first time window but is within a second time window, the second time window being larger than the first time window, then:
prompting the individual to enter a new OTP; and
accepting the login request if the new OTP is associated with a time immediately following the first time; and
otherwise, rejecting the login request; and
the second mode of operation includes:
accepting the login request, if the OTP is associated with a time within the first time window; and
otherwise, rejecting the login request.

14. A computer program product as in claim 13 wherein the first mode of operation further includes, if the OTP is associated with the time which is outside the first time window but is within the second time window, then recording a time offset to indicate a known time difference between a token clock and a server clock, the time offset being used by the computerized device to generate corrected times.

15. A computer program product as in claim 14 wherein:
the first time window is a range of time including one minute before and one minute after a current minute according to the server clock, corrected by the recorded time offset if a time offset has been recorded; and
the second time window is a range of time ranging from 5 to 72 minutes before the corrected current minute, until 5 to 72 minutes after the corrected current minute.

16. A computer program product as in claim 15 wherein the predetermined time is between about 10 minutes and 100 minutes.

17. A computer program product as in claim 13 wherein the login request further includes a static password associated with the user account, the static password being distinct from the OTP.

18. A computer program product comprising a non-transitory computer-readable medium, the computer-readable medium storing instructions, which, when performed by a computerized device, to cause the computerized device to:
receive, at a first time, via a network connection, a login request from a client device, the login request including:
a username associated with a user account; and
a one-time password (OTP) provided by a token device;
calculate whether the first time is more than a predetermined amount of time after a most-recent login to the user account;
when the first time is more than the predetermined time since the most-recent login to the user account, accept the login request according to a first mode of operation; and
when the first time is not more than the predetermined time since the most-recent login to the user account, accept the login request according to a second mode of operation;
wherein:
the first mode of operation includes:
assigning a first risk value as an OTP risk factor of the login request, if the OTP is associated with a time within a first time window;
if the OTP is associated with a time which is outside the first time window but is within a second time window, the second time window being larger than the first time window, then:
prompting the individual to enter a new OTP; and
assigning a second risk value as the OTP risk factor of the login request if the new OTP is associated with a time immediately following the first time, the second risk value being greater than the first risk value; and
otherwise, rejecting the login request;
the second mode of operation includes:
assigning a third risk value as the OTP risk factor of the login request, if the OTP is associated with a time within a first time window, the third risk value being greater than the first risk value; and
otherwise, rejecting the login request; and
the method further includes allowing the login request based on a risk score calculated by combining the assigned OTP risk factor of the login request with one or more additional risk factors of the login request.

19. A computer program product as in claim 18 wherein the login request further includes a static password associated with the user account, the static password being distinct from the OTP.

20. An apparatus comprising:
a network interface;
memory device, storing a value representing a predetermined amount of time;
a controller coupled to the network interface and the memory, the controller being configured to:
receive, at a first time, via the network interface, a login request from a client device, the login request including:
a username associated with a user account; and
a one-time password (OTP) provided by a token device;
calculate, with reference to the memory, whether the first time is more than the predetermined amount of time after a most-recent login to the user account;
when the first time is more than the predetermined time since the most-recent login to the user account, accept the login request according to a first mode of operation; and
when the first time is not more than the predetermined time since the most-recent login to the user account, accept the login request according to a second mode of operation;
wherein:
the first mode of operation includes:
accepting the login request, if the OTP is associated with a time within a first time window;
if the OTP is associated with a time which is outside the first time window but is within a second time window, the second time window being larger than the first time window, then:
prompting the individual to enter a new OTP; and
accepting the login request if the new OTP is associated with a time immediately following the first time; and
otherwise, rejecting the login request; and
the second mode of operation includes:
accepting the login request, if the OTP is associated with a time within the first time window; and
otherwise, rejecting the login request.

21. An apparatus as in claim 20 wherein the login request further includes a static password associated with the user account, the static password being distinct from the OTP.

22. An apparatus comprising:
a network interface;
memory device, storing a value representing a predetermined amount of time;
a controller coupled to the network interface and the memory, the controller being configured to:
receive, at a first time, via the network interface, a login request from a client device, the login request including:
a username associated with a user account; and
a one-time password (OTP) provided by a token device;
calculate, with reference to the memory, whether the first time is more than the predetermined amount of time after a most-recent login to the user account;
when the first time is more than the predetermined time since the most-recent login to the user account, accept the login request according to a first mode of operation; and
when the first time is not more than the predetermined time since the most-recent login to the user account, accept the login request according to a second mode of operation;
wherein:
the first mode of operation includes:
storing in memory a first risk value as an OTP risk factor of the login request, if the OTP is associated with a time within a first time window;
if the OTP is associated with a time which is outside the first time window but is within a second time window, the second time window being larger than the first time window, then:
prompting the individual to enter a new OTP; and
storing in memory a second risk value as the OTP risk factor of the login request if the new OTP is associated with a time immediately following the first time, the second risk value being greater than the first risk value; and
otherwise, rejecting the login request;
the second mode of operation includes:
storing in memory a third risk value as the OTP risk factor of the login request, if the OTP is associated with a time within a first time window, the third risk value being greater than the first risk value; and
otherwise, rejecting the login request; and
the method further includes allowing the login request based on a risk score calculated by combining the OTP risk factor of the login request stored in memory with one or more additional risk factors of the login request.

23. An apparatus as in claim 22 wherein the login request further includes a static password associated with the user account, the static password being distinct from the OTP.

* * * * *